United States Patent
Brown

[19]

[11] Patent Number: 5,817,949
[45] Date of Patent: Oct. 6, 1998

[54] ULTRASONIC FLOW METER AND METHOD

[75] Inventor: Alvin E. Brown, Santa Cruz, Calif.

[73] Assignee: Dieterich Technology Holding Corp., Boulder, Colo.

[21] Appl. No.: 726,092

[22] Filed: Oct. 4, 1996

[51] Int. Cl.$^6$ ................................................. G01F 1/66
[52] U.S. Cl. ................................................. 73/861.28
[58] Field of Search ........................... 73/861.27, 861.28, 73/861.29, 861.31, 170.13

[56] References Cited

U.S. PATENT DOCUMENTS

| | | | |
|---|---|---|---|
| 3,780,577 | 12/1973 | Brown | 73/861.28 |
| 3,818,757 | 6/1974 | Brown | 73/861.28 |
| 4,003,256 | 1/1977 | Donelan et al. | 73/861.27 |
| 4,069,713 | 1/1978 | Gassmann | 73/861.28 |
| 4,308,754 | 1/1982 | Pedersen et al. | 73/861.28 |
| 4,312,239 | 1/1982 | Zalessky et al. | 73/861.29 |
| 4,372,168 | 2/1983 | Watson | 73/861.28 |
| 4,603,589 | 8/1986 | Machida | 73/861.28 |

*Primary Examiner*—Ronald L. Biegel
*Attorney, Agent, or Firm*—Richard W. Hanes

[57] ABSTRACT

An ultrasonic flow meter (10) has a pair of transducers (36, 38). A first (36) of the pair of transducers is coupled to a first divider (18) having a first predetermined divisor. A second (38) of the pair of transducers is coupled to a second divider (24) having a second predetermined divisor. The second predetermined divisor is not equal to the first predetermined divisor. An input (16) of the first divider (18) is coupled to a first oscillator (12). An input (22) of the second divider (24) is coupled to a second oscillator (14). A decoder circuit (50) is coupled to an output (15) of the first oscillator (12) and an output (20) of the second oscillator (14). The decoder circuit (50) determines a difference frequency.

19 Claims, 5 Drawing Sheets

ULTRASONIC FLOW METER AND METHOD

FIELD OF THE INVENTION

The present invention relates generally to the field of flow meters and more specifically to an ultrasonic flow meter and method.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive materials.

Ultrasonic flow meters have a pair of transducers that are placed on either side of the flow path of a fluid flowing through a pipe. The transducers are pointed at each other and the line between them has a component in the direction of the fluid flow. The principle used to detect flow rates is that the wavelength of an ultrasonic packet will lengthen in the upstream path and shorten in the downstream path. The amount by which the wavelength changes is directly proportional to the flow rate. Ultrasonic flow meters have an upstream and a downstream voltage controlled oscillator. The upstream oscillator's frequency is adjusted until the upstream wavelength is equal to a path length between the two transducers. Similarly, the downstream oscillator's frequency is adjusted until the downstream wavelength is equal to the path length between the two transducers. The output of the upstream oscillator is then mixed with the output of the downstream oscillator to form a beat signal. The beat signal has a beat frequency that is proportional to two times the flow rate. Unfortunately, voltage controlled oscillators tend to lock in frequency when operated at similar frequencies. When the flow rate is zero the upstream oscillator has the same frequency as the downstream frequency. As a result it is common for the oscillators in ultrasonic flow meters to track each other and give false results.

One solution has been to shield the oscillators so that they do not see each other electrically. Unfortunately, it is expensive and difficult to shield the oscillators from each others EMI (Electro-Magnetic Interference).

Thus there exists a need for an ultrasonic flow meter that is accurate and overcomes the frequency lock in phenomenon associated with voltage controlled oscillators.

SUMMARY OF THE INVENTION

An ultrasonic flow meter that overcomes these and other problems has a pair of transducers. A first of the pair of transducers is coupled to a first divider having a first predetermined divisor. A second of the pair of transducers is coupled to a second divider having a second predetermined divisor. The second predetermined divisor is not equal to the first predetermined divisor. An input of the first divider is coupled to a first oscillator. An input of the second divider is coupled to a second oscillator. A decoder circuit is coupled to an output of the first oscillator and an output of the second oscillator. The decoder circuit determines a difference frequency.

DETAILED DESCRIPTION OF THE DRAWINGS

Figure 1:
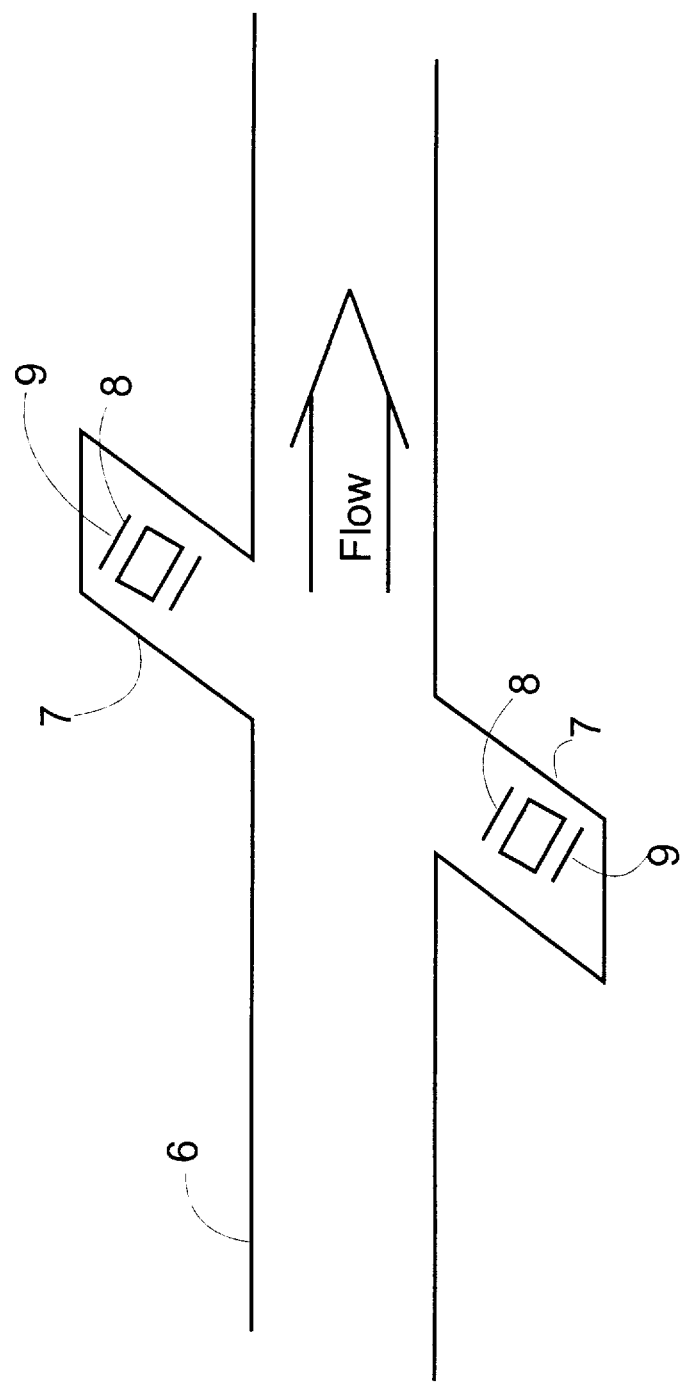
FIG. 1 is a schematic diagram of a pipe section used with an radial ultrasonic flow meter.

The invention uses a pair of unequal dividers to insure that the two voltage controlled oscillators do not operate at the same frequency. FIG. 1 is a schematic diagram of a pipe section for use with a radial ultrasonic flow meter. The pipe 6 has a pair of cylindrical arms 7, that are open to the flowing fluid. A transducer 8 is inserted into each of the cylindrical arms 7. The sonic path between the transducers 8 has a component in the direction of fluid flow. The transducers 8 are connected to an ultrasonic flow meter by a pair of transmission lines 9. The invention works with both radial ultrasonic flow meters, as shown if FIG. 1 and axial ultrasonic flow meters.

Figure 2:
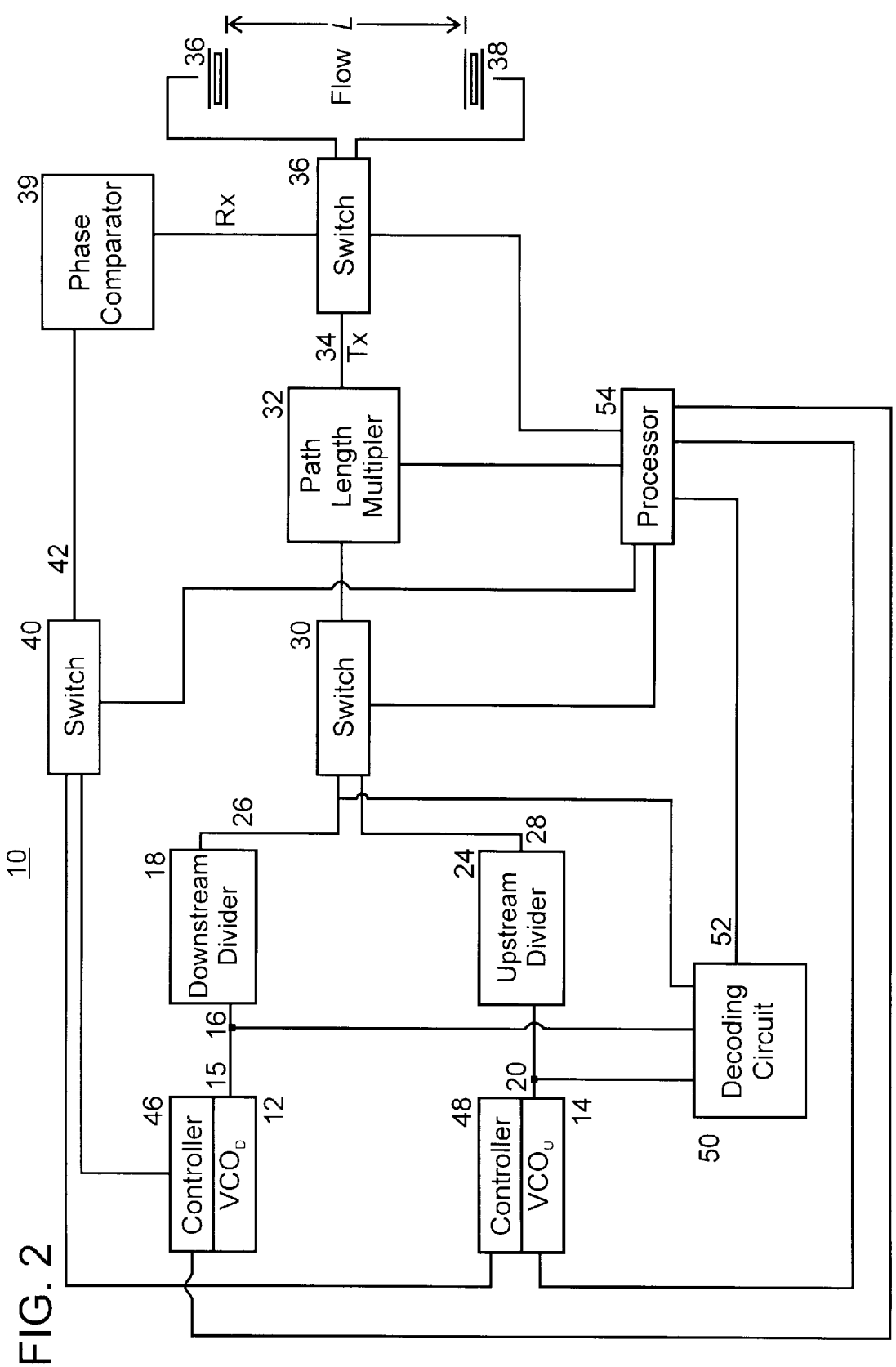
FIG. 2 is a block diagram of an ultrasonic flow meter.

FIG. 2 is a block diagram of an ultrasonic flow meter 10. The flow meter 10 has a first voltage controlled oscillator (downstream oscillator, first oscillator) 12 and a second voltage controlled oscillator 14 (upstream oscillator, second oscillator). The downstream oscillator 12 has an output 15 coupled to an input 16 of a downstream divider (first divider) 18. The upstream oscillator has an output 20 coupled to an input 22 of an upstream divider (second divider, second dividing factor) 24. An output 26 of the downstream divider 18 and an output 28 of the upstream divider 24 are coupled to a switch 30. The switch 30 alternately connects the upstream oscillator 14 and the downstream oscillator 12 to a path length multiplier 32. The path length multiplier 32 has a variable divisor. The variable divisor is adjusted so that a wavelength of the oscillator signal at the output 34 of the path length multiplier 32 is approximately equal to a path length (L) between a pair of transducers 36, 38. The output 34 of the path length multiplier 32 is connected to a switch 36. The switch 36 alternately connects the output 34 of the path length multiplier 32 to a first 36 of the pair of transducers or to a second 38 of the pair of transducers. The transducer that is not connected to the output 34 of the path length multiplier 32 is connected to a phase comparator 39. The phase comparator 39 determines whether the oscillator's wavelength is longer or shorter than the path length L. A switch 40 connects the output 42 of the phase comparator 39 to the appropriate oscillator controller 46, 48. Once the oscillators are locked onto the correct frequency a decoding circuit 50 samples the oscillator signals at various points and converts the oscillator signals into flow data signal 52. A processor 54 controls all the various switches 30, 36, 40 and sets the path length multiplier's variable divider value. The processor 54 is also in communication with the oscillator controllers 46, 48. The processor 54 converts the flow data signal into a flow rate.

Figure 3:
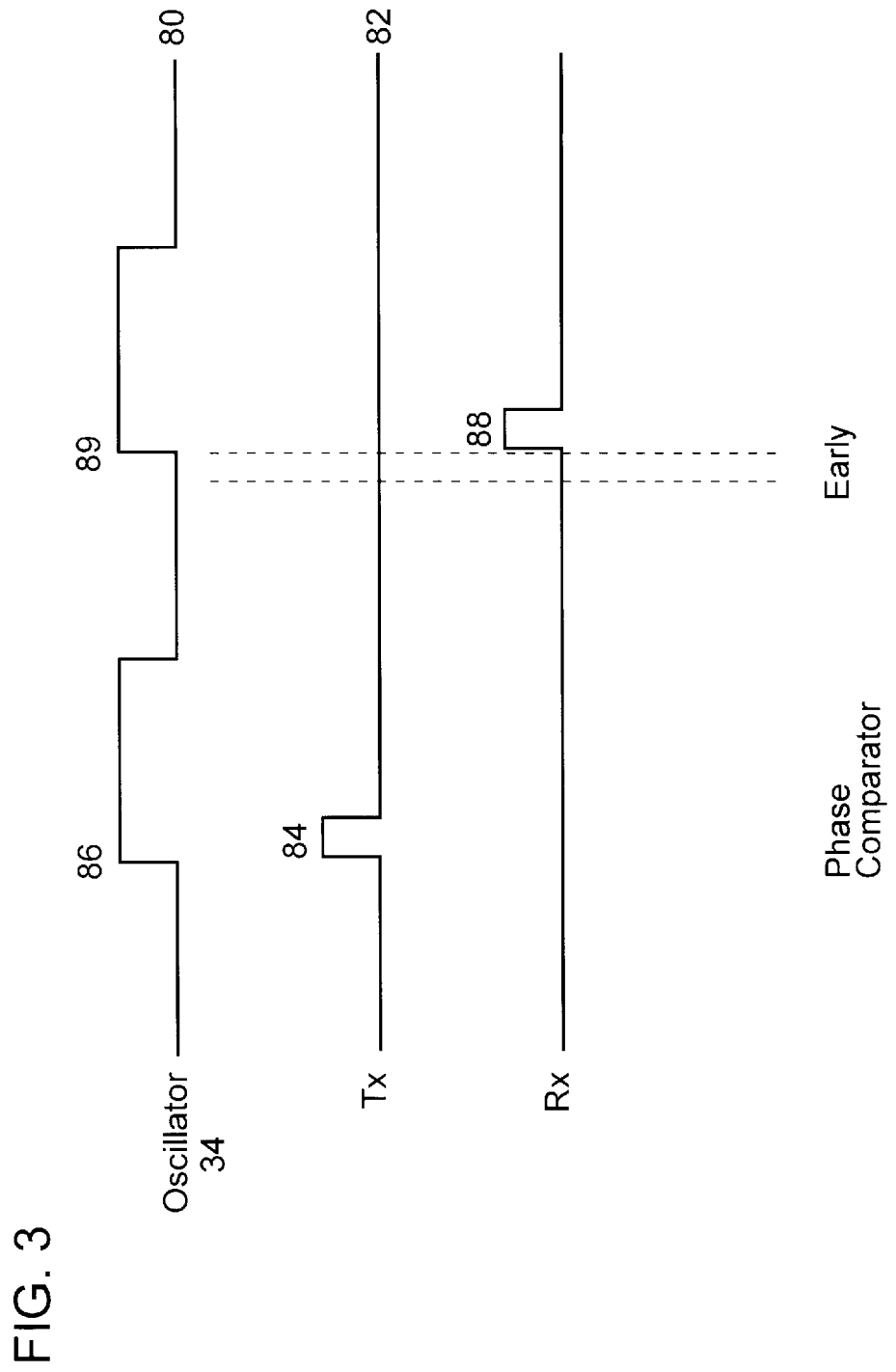
FIG. 3 is a timing diagram associated with the ultrasonic flow meter of FIG. 2.

FIG. 3 shows a timing diagram that explains how the flow rate meter 10 adjusts the oscillator signal's frequency. The output of one of the oscillators is coupled by the switches 30, 36 to the appropriate transducer 36, 38. If we assume that the fluid is flowing from transducer 36 to transducer 38, then the downstream oscillator 12 is coupled to the transducer 36 and the transducer 38 is coupled to the phase comparator 39. In this situation the output 42 of the phase comparator 39 is coupled to the controller 46. The downstream oscillator signal 15 after being divided down by the downstream divisor (downstream dividing factor, first dividing factor) 18 and the path length multiplier 32 is shown as the first trace 80 of FIG. 3. The output of the transmitting transducer 36 is shown as the second trace 82. The transmitting transducer 36 sends out a very short pulse 84 when it detects an initial rising pulse 86 from the oscillator. The receiving transducer 38 detects the transmitted sonic pulse approximately one cycle after the pulse was transmitted. The received pulse 88 is compared to the next rising edge 89 of the trace 80 in the phase comparator 39. When the phase comparator 39 detects that the received pulse 88 arrived before the next rising edge 89 it sends the early message to the controller 46. The controller 46 increases the frequency (shortens the wavelength) of the oscillator, in response to an early message from the phase comparator. This causes the received signal 88 to eventually align with the second rising edge 89. In this way the oscillator signal's frequency is adjusted so that the wavelength at the transducers is equal to the path length L. This process is alternately performed for the upstream oscillator 14 and the downstream oscillator 12, by setting the switches 30, 36 40.

Figure 4:
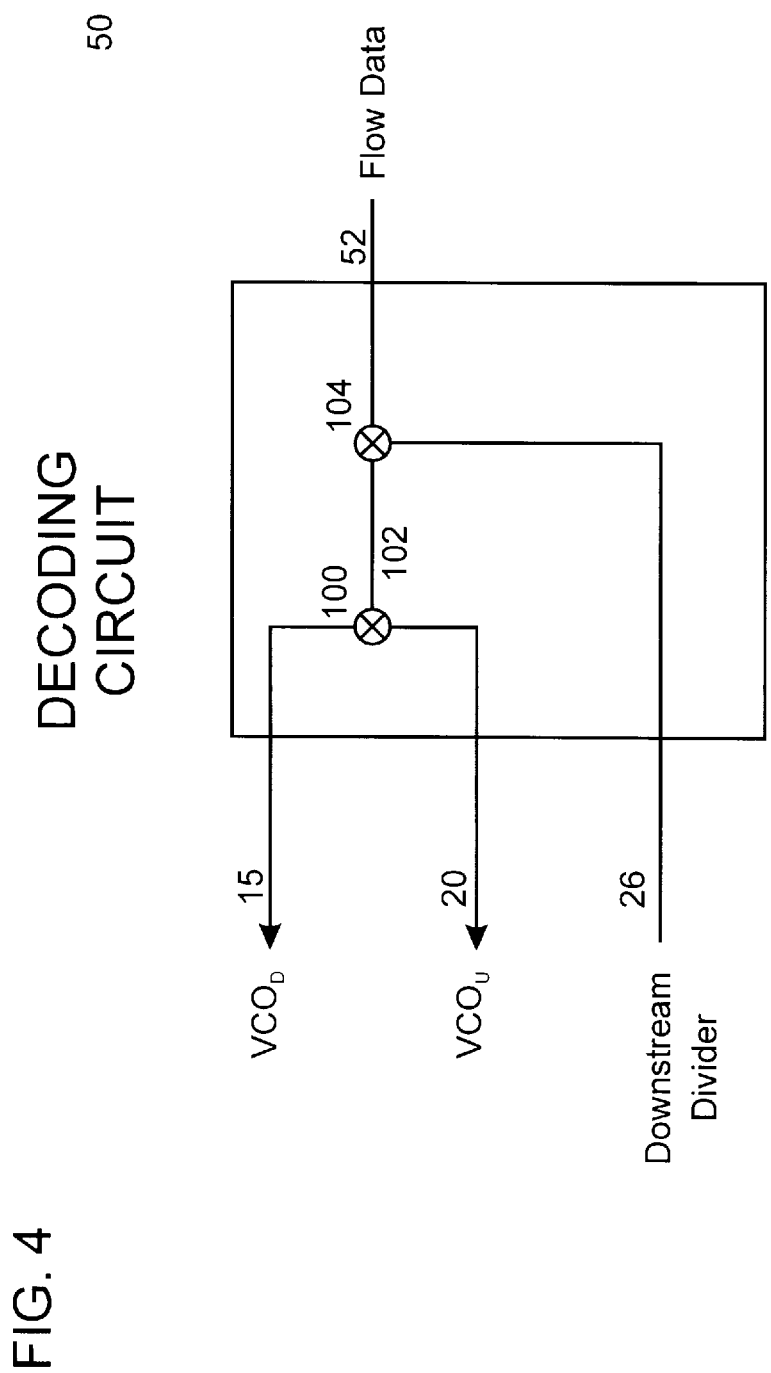
FIG. 4 is a schematic diagram of a decoder circuit used in the ultrasonic flow meter of FIG. 2.

FIG. 4 shows a schematic diagram of the decoding circuit 50. The decoding circuit (decoder circuit) 50 mixes the downstream oscillator signal (first frequency) 15 with the upstream oscillator signal (second frequency) 20, in a mixer 100. The output (difference signal) 102 of the mixer 100 is mixed in a second mixer 104 with the output 26 of the downstream divider 18 to form the flow data signal 52. Mathematically, it can be shown that if the downstream divisor is chosen to be one less than the upstream divisor then the frequency of the flow data rate signal 52 is proportional to the flow rate. In addition, the frequency of the flow data rate signal 52 is an integer multiple of the beat frequency (flow velocity frequency) that would be obtained by mixing the upstream signal at point 34 with the downstream signal at point 34, as is done in the prior art. Because the flow rate signal's frequency is an integer multiple of the beat signal used in most prior art ultrasonic flow meters, the resolution is an integer multiple greater than obtained with prior art methods.

Figure 5:
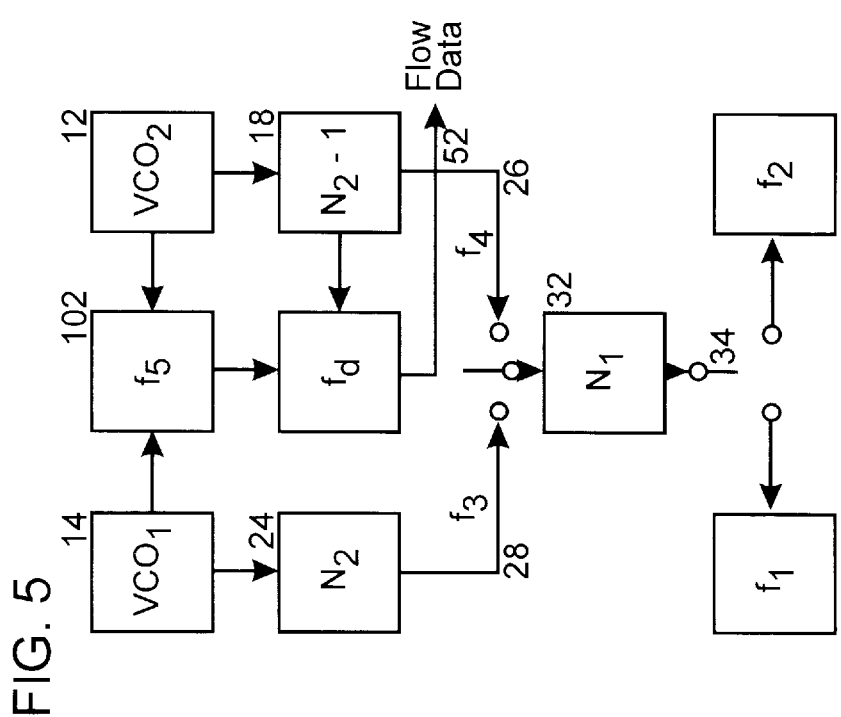
FIG. 5 is a schematic diagram of the ultrasonic flow meter of FIG. 2.

FIG. 5 is schematic diagram of the ultrasonic flow rate meter 10 of FIG. 2. If $f_2$ is defined as the frequency of the downstream signal at the transducer, when the downstream wavelength is equal to the path length (L), then $f_2=(C+V)/L$. Where C is the speed of sound in the flowing fluid, V is the flow rate between the transducers and L is the sonic path length between the transducers. $f_4$ is the frequency of the intermediate downstream signal and is equal to $N_1$ times $f_2$. Where $N_1$ is the path length divider (multiplier). Similarly, $f_3$, which is the frequency of the intermediate upstream signal, is equal to the $N_1$ times $f_1$. Where $f_1$ is the frequency of the upstream signal, when the upstream wavelength is equal to the path length (L) and equals $(C-V)/L$. The frequency of the downstream oscillator signal 12 is equal to $N_1*(N_2-1)*f_2$. The frequency of the upstream oscillator signal 20 is equal to $N_1*(N_2)*f_1$. By selecting the downstream multiplier 18 to be one less than the upstream multiplier 24, the flow data signal frequency, $f_d$, is equal to $N_1*N_2*V/L$. Where V is the flow rate (if the path between the two transducers is parallel to the flow direction) and L is the acoustic path length between the transducers. Thus the flow rate is found by multiplying the flow frequency by a predetermined factor. When the downstream divisor (downstream factor) is not chosen to be one less than the upstream divisor (upstream factor) the equation for the flow data signal's frequency (flow frequency) is a function of the speed of sound. This is undesirable because the speed sound will fluctuate with temperature and pressure and the speed of sound may not by known for the particular fluid.

As can be seen from FIG. 5, the downstream oscillator signal's frequency (first output frequency) will not be equal to the upstream oscillator signal's frequency (second output frequency) when the flow rate is zero. When the flow rate is zero $f_1=f_2$ and therefore $f_3=f_4$. As a result, the upstream oscillator signal's frequency will be $f_3*N_2$ and the downstream oscillator signal's frequency will be $f_3*(N_2-1)$. Because the two oscillators do not have the same output frequency they will not frequency lock to each other as happens in the prior art. The other situation where the two oscillators can have the same frequency is at high flow rates (maximum flow rate design). The higher the flow rate the lower the upstream oscillator signal's frequency and the higher the downstream signal's frequency. The lower the divider $N_2$ is chosen to be, the farther apart the oscillator's frequencies will be with no flow. As a result if $N_2$ is selected below about 18 then there are almost no practical situations in which the two oscillator's frequencies would be the same. In the preferred embodiment, $N_2$ is selected to be 16.

Figure 6:
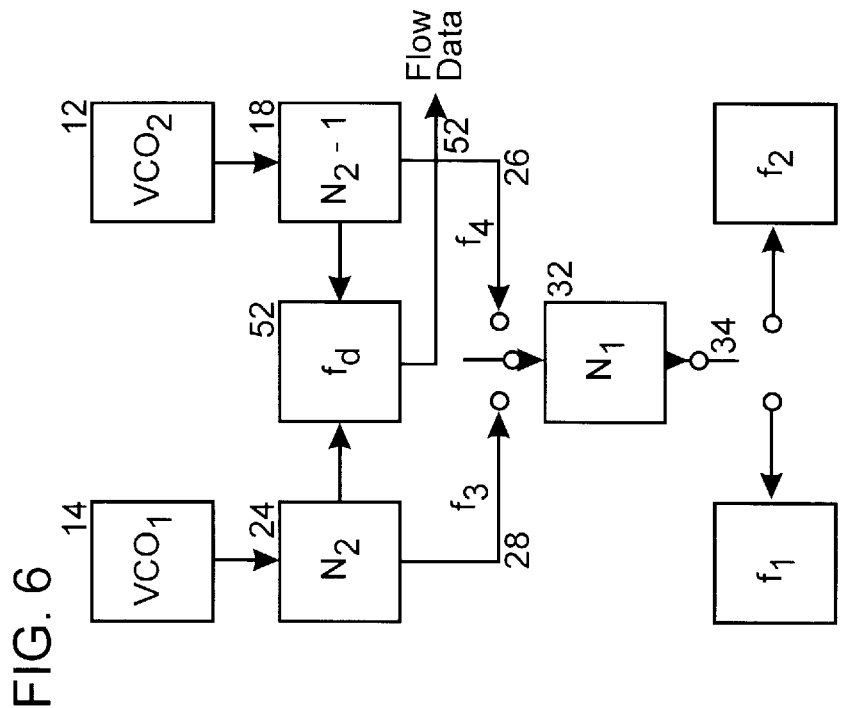
FIG. 6 is a schematic diagram of an alternative embodiment of the ultrasonic flow meter of FIG. 2.

FIG. 6 shows an alternative embodiment of the invention. In this embodiment the flow data signal is created by mixing the intermediate upstream signal 28 and the intermediate downstream signal 26. As a result the flow data signal's frequency $f_d$ is $N_1$ times beat signal frequency (i.e., the signal generated by mixing the upstream signal $f_1$ and the downstream signal $f_2$). Where the beat frequency is $2V/L$. The expression does not include the speed of sound and has $N_1$ times the resolution of the beat signal. In addition, the upstream oscillator's frequency and the downstream oscillator's frequency are spaced apart when there is no flow in the pipe.

Thus there has been described a ultrasonic flow meter that does not result in the two voltage controlled oscillators becoming locked in frequency. In addition, the ultrasonic flow meter described herein has a significantly higher resolution than prior art ultrasonic flow meters. The invention described herein applies to both axial and radial ultrasonic flow meters. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. An ultrasonic flow meter comprising:
   a pair of transducers;
   a first divider having a first predetermined divisor coupled to a first of the pair of transducers;
   a second divider having a second predetermined divisor coupled to a second of the pair of transducers, the second predetermined divisor not being equal to the first predetermined divisor;
   a first oscillator coupled to an input of the first divider;
   a second oscillator coupled to an input of the second divider;
   a decoder circuit coupled to an output of the first oscillator and an output of the second oscillator, the decoder circuit determining a difference frequency.

2. The ultrasonic flow meter of claim 1, wherein the decoder circuit mixes the difference frequency with an output of the first divider to form a flow data signal.

3. The ultrasonic flow meter of claim 2, wherein the flow data signal has a flow frequency that is an integer multiple of a beat frequency.

4. The ultrasonic flow meter of claim 1, further including a path length divider having a variable divisor coupled between the first of the pair of transducers and the first divider.

5. The ultrasonic flow meter of claim 1, wherein the first predetermined divisor is equal to the second predetermined divisor plus one.

6. The ultrasonic flow meter of claim 1, wherein the first oscillator has a first output frequency and the second oscillator has a second output frequency and the first output frequency is never equal to the second output frequency for a flow rate less than 80 feet per second (24 meters per second).

7. The ultrasonic flow meter of claim 1, wherein the first oscillator is a voltage controlled oscillator.

8. The ultrasonic flow meter of claim 1, wherein the first predetermined divisor is less than eighteen.

9. An ultrasonic flow meter comprising:
- a first voltage controlled oscillator;
- a second voltage controlled oscillator;
- a first divider having a first dividing factor coupled to the first voltage controlled oscillator;
- a second divider having a second dividing factor that is different than the first dividing factor, the second divider coupled to the second voltage controlled oscillator;
- a first switch having a first terminal coupled to an output of the first divider and a second terminal coupled to an output of the second divider;
- a path length multiplier connected to a third terminal of the first switch;
- a second switch having a forth terminal coupled to the output of the path length multiplier;
- a first transducer coupled to a fifth terminal of the second switch; and
- a second transducer coupled to a sixth terminal of the second switch.

10. The ultrasonic flow meter of claim 9, further including a decoding circuit coupled to the first terminal and to the second terminal.

11. The ultrasonic flow meter of claim 10, wherein the decoding circuit has a flow rate signal as an output.

12. The ultrasonic flow meter of claim 11, wherein the flow rate signal has a flow frequency that is an integer multiple of a flow velocity frequency.

13. The ultrasonic flow meter of claim 9, wherein the first voltage controlled oscillator has a first frequency and the second voltage controlled oscillator has a second frequency and the first frequency is not equal to the second frequency for a flow rate up to 80 feet per second (24 m/s).

14. A method of determining a flow rate comprising the steps of:
- (a) adjusting an upstream oscillator signal so that an upstream signal has an upstream wavelength equal to an upstream path length between a pair of transducers;
- (b) adjusting a downstream oscillator signal so that a downstream signal has a downstream wavelength equal to a downstream path length between the pair of transducers;
- (c) multiplying the upstream oscillator signal by the down stream oscillator signal to form a difference signal;
- (d) multiplying the difference signal by the downstream signal divided by a downstream multiplier to form a flow data signal having a flow frequency;
- (e) determining the flow rate by multiplying the flow frequency by a predetermined factor.

15. The method of claim 14, wherein step (a) further includes the steps of:
- (a1) dividing the upstream oscillator signal by an upstream factor to form an intermediate upstream signal; and
- (a2) dividing the intermediate upstream signal by a path length divider to form the upstream signal.

16. The method of claim 15, wherein step (b) further includes the steps of:
- (b1) dividing the downstream oscillator signal by a downstream factor to form an intermediate downstream signal; and
- (b2) dividing the intermediate downstream signal by the path length divider to form the downstream signal.

17. The method of claim 16, wherein the downstream factor is selected to not be equal to the upstream factor.

18. The method of claim 16, wherein the downstream factor is selected to be equal to the upstream factor plus one.

19. The method of claim 16, wherein step (a1) further includes selecting the upstream factor and the downstream factor so that the upstream oscillator signal and the downstream oscillator signal will never have the same frequency for the flow rate of zero to a maximum flow rate design.

* * * * *